(12) United States Patent
Hoover et al.

(10) Patent No.: US 6,268,957 B1
(45) Date of Patent: Jul. 31, 2001

(54) COMPUTER CONTROLLED STEREO MICROSCOPY

(76) Inventors: Rex A. Hoover; Robert G. Hoover, both of 5263 Stewart Rd., Summerduck, VA (US) 22742

( * ) Notice: Subject to any disclaimer, the term of this patent is extended or adjusted under 35 U.S.C. 154(b) by 0 days.

(21) Appl. No.: 09/668,069

(22) Filed: Sep. 25, 2000

(51) Int. Cl.⁷ .................................................. G02B 21/00
(52) U.S. Cl. .................. 359/368; 359/377; 359/380; 359/393
(58) Field of Search .................... 359/363, 368, 359/372, 373, 376, 377, 379, 380, 393

(56) References Cited

U.S. PATENT DOCUMENTS

| | | |
|---|---|---|
| 3,818,125 | 6/1974 | Butterfield . |
| 3,873,182 | 3/1975 | Furuhasi . |
| 4,195,903 | 4/1980 | Kawase . |
| 4,447,717 | 5/1984 | Nohda . |
| 4,653,878 | 3/1987 | Nakasato . |
| 4,705,367 | 11/1987 | Eckbreth . |
| 4,744,642 | 5/1988 | Yoshinaga . |
| 5,054,896 | 10/1991 | Margolis . |
| 5,307,202 | 4/1994 | Martino . |
| 5,394,267 | 2/1995 | Hanzawa . |
| 5,537,248 | 7/1996 | Sander . |
| 5,539,572 | 7/1996 | Greenberg . |
| 5,661,598 | 8/1997 | Tomioka . |
| 5,663,834 | 9/1997 | Koizumi . |
| 5,668,660 | 9/1997 | Hunt . |
| 5,706,127 | 1/1998 | Saito . |
| 5,729,382 | 3/1998 | Morita . |
| 5,825,532 | 10/1998 | Mochizuki . |
| 5,825,535 | 10/1998 | Biber . |
| 5,949,574 | 9/1999 | Kapitza . |
| 6,046,844 * | 4/2000 | Duis ..................................... 359/392 |

* cited by examiner

Primary Examiner—Cassandra Spyrou
Assistant Examiner—Mark A. Robinson
(74) Attorney, Agent, or Firm—C. C. Shroff; Papan Devnani, Esq.

(57) ABSTRACT

A computerized control and display system for a stereo microscope is disclosed. The objective lens is selected for a minimum and maximum magnification range and then two sets of movable lenses within the stereo module are positioned through computer control to achieve a precisely desired magnification. In the preferred embodiment, a lookup table is used to smoothly select the proper position of the two movable lenses in relationship to one another as the magnification is either increased or decreased. A stereoscopic image is transmitted by cameras to a computer screen with the use of a wireless eyewear/shutter system cycling at 120 cycles per second for viewing.

8 Claims, 5 Drawing Sheets low mag high mag

COMPUTER CONTROLLED STEREO MICROSCOPY

BACKGROUND OF THE INVENTION

1. Field of the Invention

The present invention relates generally to the field of optics. More specifically, it relates to the field of microscopy. Even more specifically, it relates to the field of stereoscopic microscopy. Even more specifically, it relates to the field of digitally controlled stereo microscopy, wherein the image is transmitted to a computer screen and the magnication, zoom, and focus is controlled through a software based interface.

2. Description of the Prior Art

One of the major problems inherent in the type of microscopy wherein a fixed objective in combination with two movable lenses or lens sets are used to zoom and focus the image on the stage is that the manual controls for these devices are extremely difficult to manufacture and are very delicate, adding to both the cost of the device and subsequent breakdowns and repairs. This is because the distances between the movable lenses and the stationary lenses that they cooperate with each other to move between low and high zoom are not linear. As the user zooms in on the image through the fixed objective, from low to high, a graphed comparison measuring distance between the lower movable lens or lens set and its respective lower stationary lens or lens set and the corresponding movable and stationary upper lens or lens set become less and less iear, especially at higher magnifications Thus eccentric threading, cams, and the like must be used to allow the user to precisely control the zoom while focusing the image. Additionally, the present invention addresses the problem that in existing microscopy systems that use this movable lens pair or pairs system to zoom in and out and focus on the resultant image, remote control is very difficult and slow, if not impossible. The present invention, by supplying a smooth, computer controlled zoom and focus system over the range provided by the objective makes such tasks at a remote location simple. Combined with a stage movable on an X-Y axis under the same computer control along with a vertical control of the optics module, microscopic level inspections of silicon wafers, biological subjects, metallurgical samples, or other similar objects may be accomplished at the remote location Simultaneous movement of both lenses or lens sets is provided by a software routine that uses a lookup table or the like to set the precise axial distance between the controlled optic stages to provide a focused image at a desired magnification or zoom level In the preferred embodiment, video cameras transfer the image to a computer screen where the user is also controlling the magnification and zoom. Additionally, using multiplexed, "frame sequenced" images along with a wireless stereoscopic switching glasses cycling at 120 times per second, a live, high definition stereoscopic image is made available to the user. Thus, the instant invention provides a valuable tool for applications such as telemedicine, remote operation and/or inspection, defect and failure analysis, quality control, and learning at a distance. Additionally, people with disabilities using special computer controls, can do valuable work that they were previously unable to do.

During a search at the U.S. Patent and Trademark Office, a number of relevant patents were uncovered and they will be discussed below.

First is U.S. Pat. No. 3,818,125 issued on Jun. 18, 1974 to James F. Butterfield. This discloses a stereo television microscope where the two slightly different images are alternated and the viewer, looking through a stereo mask, perceives a three dimensional image. This is completely unlike the present invention in that no teaching of the software controlled positional settings of the movable lens sets is taught.

U.S. Pat. No. 3,873,182 issued on Mar. 25, 1975 to Hidehio Furuhasi discloses a magfication varying device in an optical instrument. This is also dissimilar from the present invention in that no teaching of the simultaneously changing distance between a pair of movable lens sets is set out.

In U.S. Pat. No. 4,195,903 issued to Suminosuke Kawase et al. on Apr. 1, 1980 there is disclosed a binocular microscope with lenses rotatable in the plane of the optical axes. Unlike the present invention, axial distance between sets of lens pairs in unchanged.

An automatic focusing device is disclosed in U.S. Pat. No. 4,447,717 issued to Massao Nohda on May 8, 1984. This is an automatic focusing device that uses a position sensor on the sample, unlike the present invention.

In U.S. Pat. No. 4,653,878 issued to Kanae Nakasato on Mar. 31, 1987 there is disclosed a microscope equipped with a device for driving the revolver and the stage. This is accomplished with a photosensor, unlike the present invention.

U.S. Pat. No. 4,705,367 issued on Nov. 10, 1987 to Alan C. Eckbreth et al. discloses an optical system having a variable focal length. Unlike the present invention, there is no teaching of the lens sets or the look-up table.

In U.S. Pat. No. 4,744,642 issued to Makoto Yoshinaga et al. on May 17, 1987 there is disclosed a microscope. In this system, the objective is movable in relation to the sample. This is clearly unlike the present invention.

In U.S. Pat. No. 5,054,896 issued on Oct. 8, 1991 to H. Jay Margolis there is disclosed a continuously focusable microscope. There are three lenses or sets of lens, which is dissimilar from the instant invention.

U.S. Pat. No. 5,307,202 issued to Ronald J. Martino et al on Apr. 26, 1994 discloses a copy port wherein digital stored images may be manipulated, stored, or viewed through eyepieces. No teaching of the look-up table for the automatic setting of focal distance between the lenses is seen.

U.S. Pat. No. 5,394,267 issued on Feb. 28, 1995 to Toyo Hanzawa discloses a stereomicroscope. Unlike the present invention, this invention utilizes eyepieces and a single objective lens.

An accessory for a stereo microscope is disclosed in U.S. Pat. No. 5,537,248 issued to Ulrich Sander on Jul. 16, 1996. This invention is directed at pivotal optical elements, which is clearly dissimilar from the present invention.

U.S. Pat. No. 5,539,572 issued on Jul. 23, 1996 to Gary Greenberg et al. discloses a microscopic Iumiation and viewing system Unlike the present invention, there is no teaching of the paired fixed and movable lenses or lens sets.

U.S. Pat. No. 5,661,598 issued on Aug. 26, 1997 to Ken Tomioka discloses a optical instrument with a single eyepiece unit. This is clearly unlike the construction of the instant invention.

U.S. Pat. No. 5,663,834 issued to Noburu Koizumi on Sep. 2, 1997 discloses a zoom lens system dissimilar from the present invention in that it has a single fixed ens group and a pair of movable lens groups.

U.S. Pat. No. 5,668,660 issued on Sep. 16, 1997 to Gary D. Hunt discloses a microscope with a plural zoom lens assembly. Unlike the present invention, this includes a selectively movable prism in the optical path.

An electrically driven microscope is disclosed in U.S. Pat. No. 5,706,127 issued to Hiroko Saito et al. on Jan. 6, 1998. Unlike the present invention, there is no teaching of the paired fixed and movable lenses or lens sets of the instant invention.

U.S. Pat. No. 5,729,382 issued on Mar. 17, 1998 to Kazuo Morita et al. discloses a stereoscopic microscope. As with many of the other patents discussed above, there is no teaching of the look-up table and the automatic focal length setting.

Another patent of interest is U.S. Pat. No. 5,825,532 issued on Oct. 20, 1998 to Ryo Mochizuki et al. This discloses a microscopic system integrated with a wide screen television. None of the control features of the instant invention are taught.

In U.S. Pat. No. 5,825,535 issued to Klaus Biber et al. there is shown a pancratic magnification system that is unlike the present invention in that there is no teaching of the computer controlled lens set adjustments.

Lastly, U.S. Pat. No. 5,949,574 issued on Sep. 7, 1999 to Hans-Georg Kapitza discloses a computer supported video microscope. Unlike the present invention, there is no teaching of the paired fixed and movable lenses or lens sets.

Thus, while the foregoing overview of prior art indicates it to be well known to digitally control microscopes and to use similar types of lens arrangements it is not seen that the novel control system and construction of the present invention is taught either singly or in combination by any of the art of record.

SUMMARY OF THE INVENTION

To achieve the foregoing and other advantages, the present invention, briefly described, provides a computerized control and display system for a stereo microscope. The objective lens is selected for a minimum and maximum magnification range and then two sets of movable lenses within the stereo module are positioned through computer control to achieve a precisely desired magnification. In the preferred embodiment, a lookup table is used to smoothly select the proper position of the two movable lens sets in relationship to one another as the magnification is either increased or decreased. A stereoscopic image is transmitted by cameras to a computer screen with the use of a wireless eyewear/shutter system cycling at 120 cycles per second.

Thus it is a principal object of the invention to provide a unique, computer controlled microscopy system wherein the zoom and focus control within the range of a chosen objective lens is predetermined and controlled by an algorithm.

An additional object of the invention to provide a computer controlled stereo microscopy system wherein the magnification and focus is precisely controlled to allow hands free usage of the machine.

Another object of the invention is to provide a computer controlled stereo microscopy system that obviates the need for mechanical linkages that are both difficult to machine and that have a tendency to malfunction due to the delicacy and fine tolerances required.

Yet another object of the invention is to provide a computer controlled stereo microscopy system that allows remote viewing for three dimensional microscopic examination of parts in dangerous environments.

Still yet another object of the invention is to provide a computer controlled stereo microscopy system that provides for smooth magnification zoom and automatic proportional focusing by using a lookup table for positioning of the movable lens sets of the invention in relation to one another.

Still yet another object of the invention is to provide a computer controlled stereo microscopy system that allows disabled people to easily operate the machine.

Still yet another object of the invention is to provide a computer controlled stereo microscopy system that does away with the necessity to stoop over eyepieces or the like to examine a sample.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof Such description makes reference to the annexed drawings wherein.

DESCRIPTION OF THE PREFERRED EMBODIMENT

Figure 1:
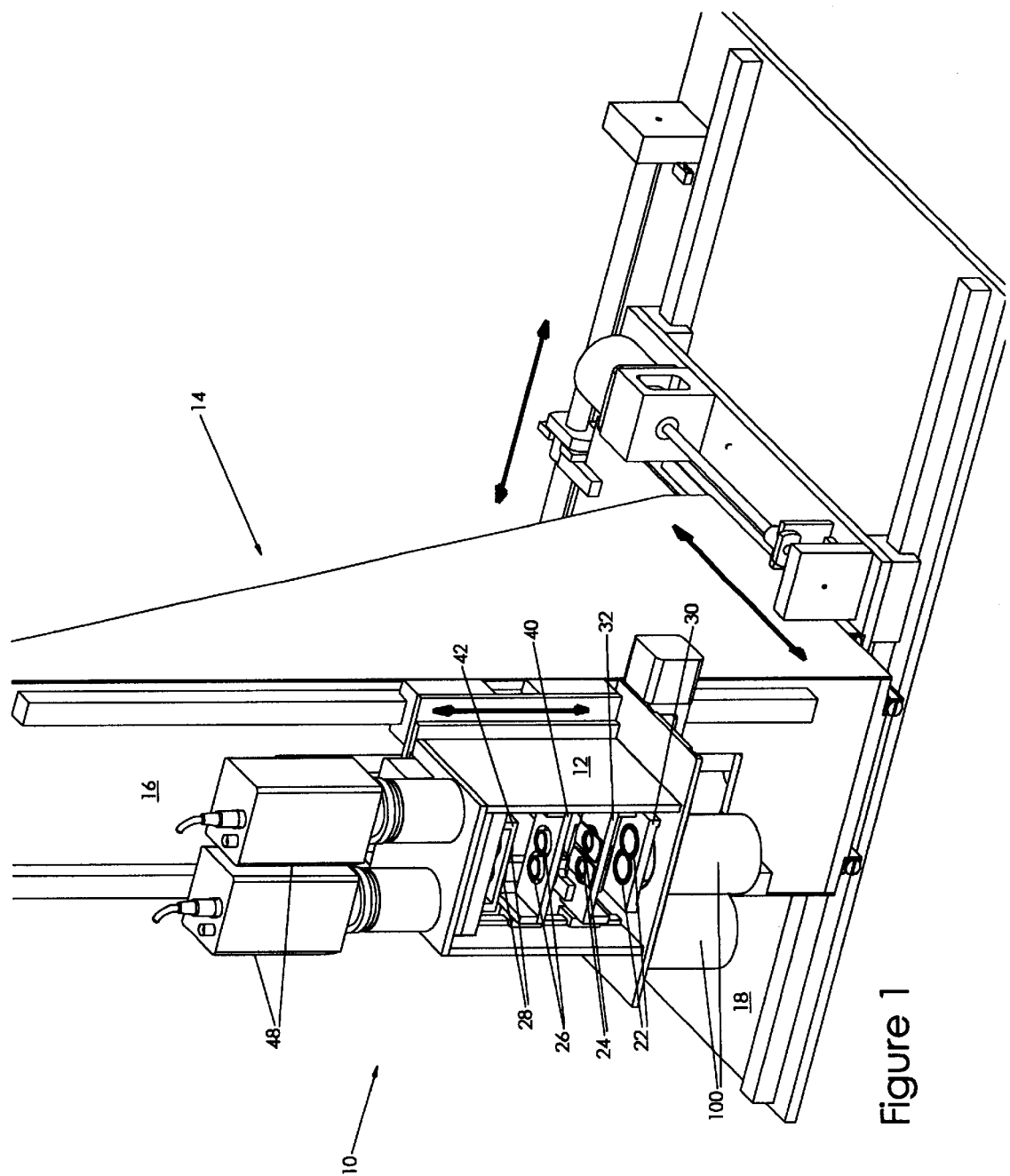
FIG. 1 is a perspective view of the stereo module of the present invention mounted on the vertical and horizontal X-Y axis control assemblies with the front panel removed to show the fixed and movable lens sets disposed within.

Turning first to FIG. 1, the invention in general is indicated at 10. The computer controlled microscopy stereo module 12 is located mounted on a top assembly 14. Through means of a stepper motor driving an endless threaded screw (not shown), the stereo module 12 is movable up and down the substantially flat front face 16 of the top assembly 14 with great accuracy. It should be understood that the top assembly 14 is also located on a base assembly 18 and, through another pair of stepper motors driving endless threaded screws perpendicular to one another, X-Y control is also provided for. Thus, the stereo module 12 can be specifically located at a predetermined height and at a predetermined location over a sample or specimen.

Figure 2:
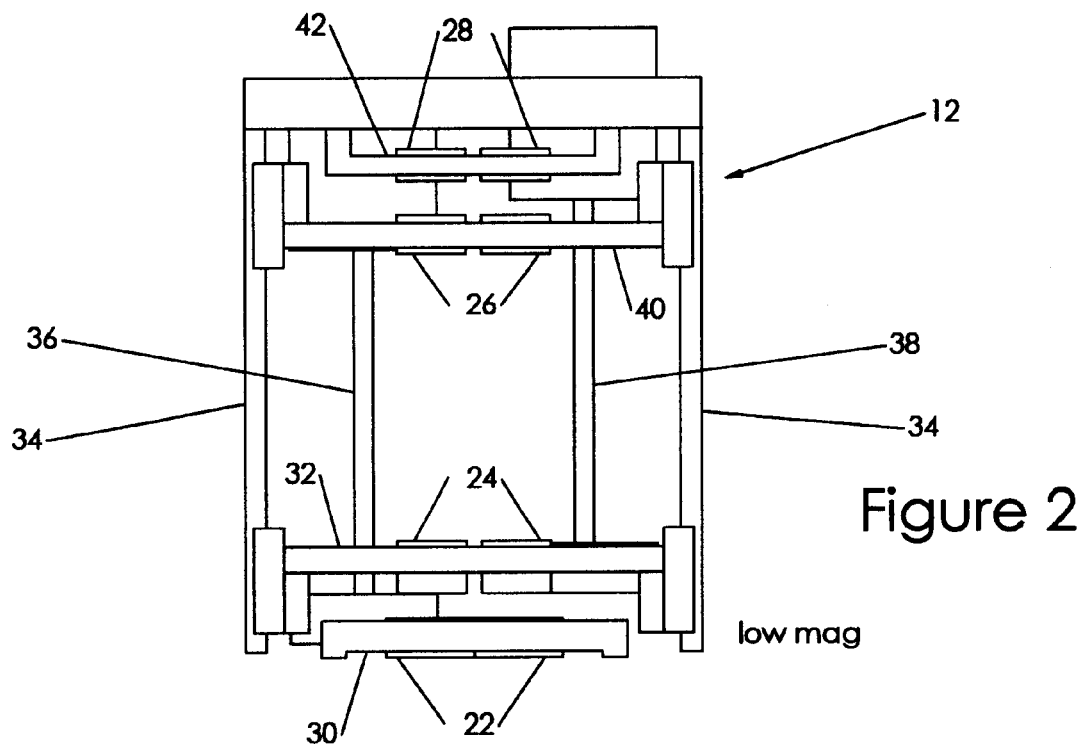
FIG. 2 is a front plan view of the interior of the stereo module showing the disposition of the fixed and movable lens sets of the instant embodiment in a low magnification configuration.
Figure 3:
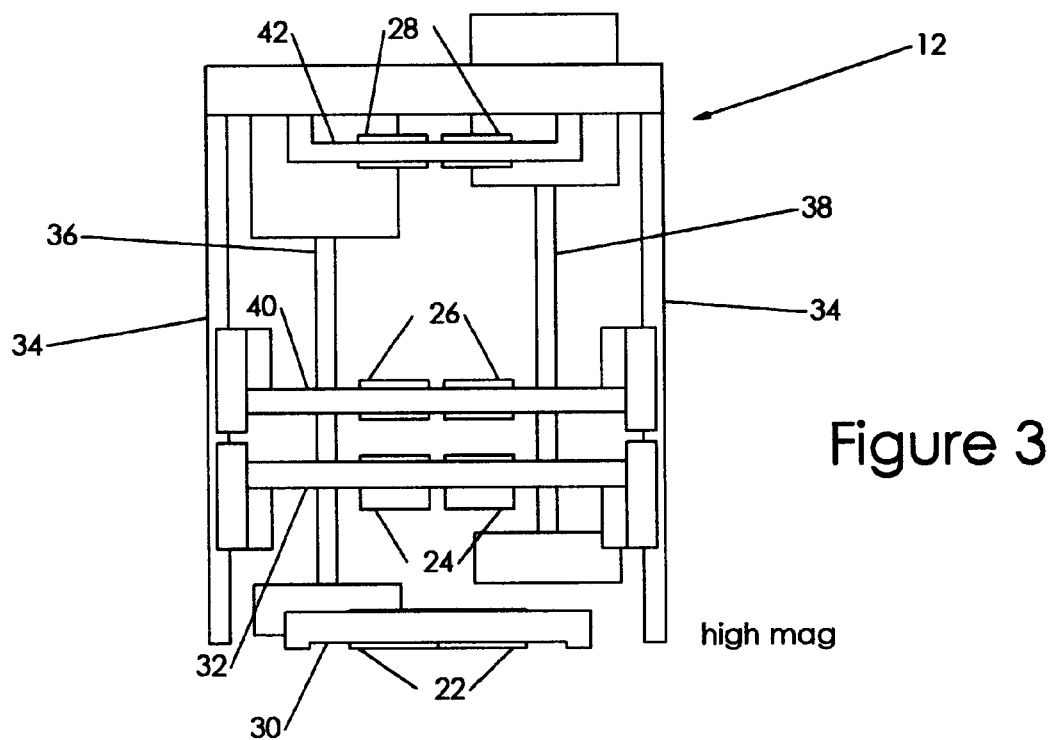
FIG. 3 is a front plan view of the interior of the stereo module showing the disposition of the fixed and movable lens sets of the instant embodiment in a high magnification configuration.
Figure 6:
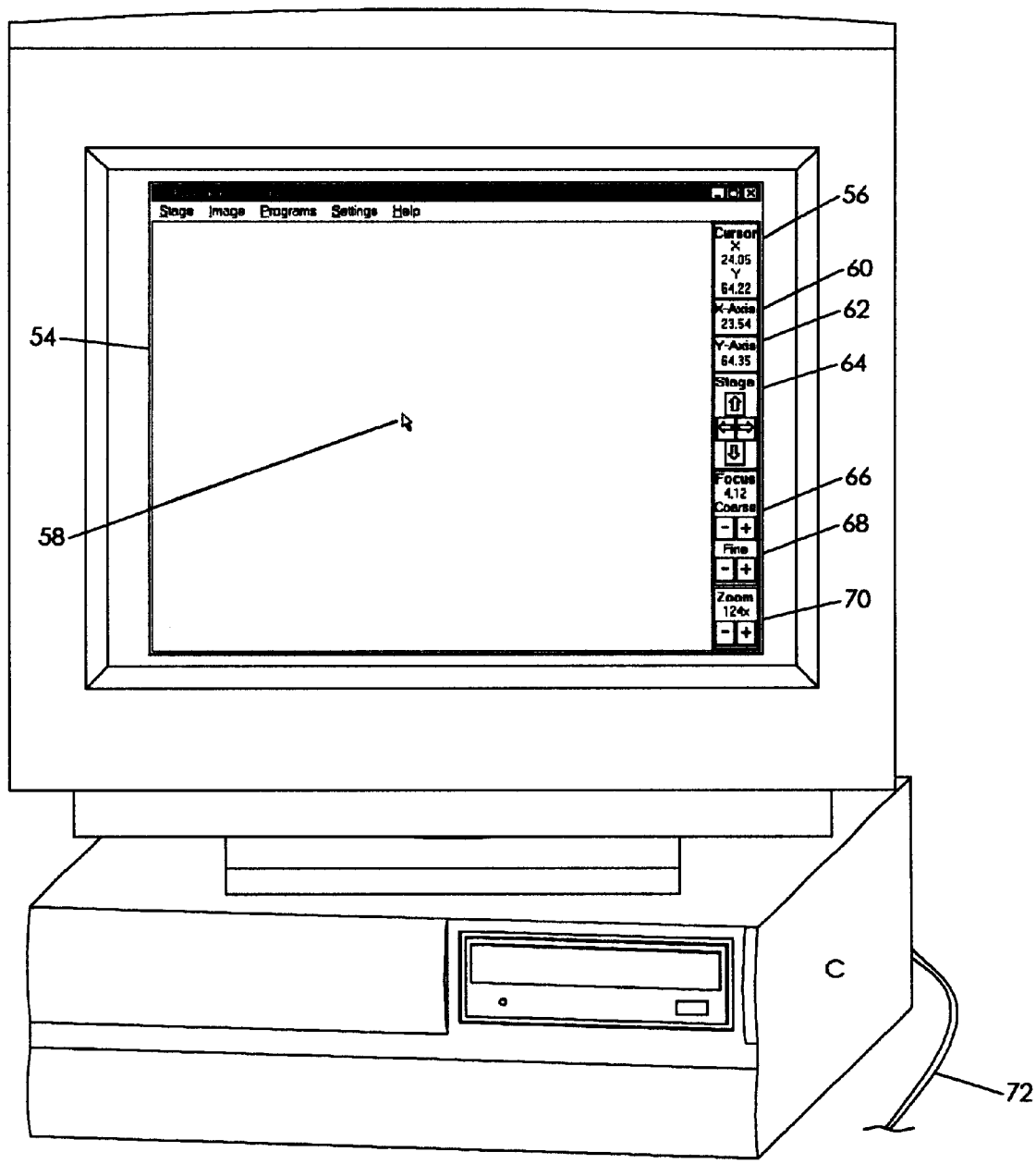
FIG. 6 is an exploded view of the five lens sets apart from their carriages in the instant embodiment of the invention.

The overall internal details of stereo module 12 will now be detailed. In the instant embodiment there are five sets of lenses, not including the objective 100, which will be discussed separately. All five of these sets are seen in FIG. 6, whereas in FIGS. 2 and 3, the camera relay lens set 20 and their corresponding first surface mirrors M are not shown. The details of the stereo module 12 lens assemblies can be best studied referring to FIGS. 1, 2, and 3. In the embodiment described herein, the lower pair of lens sets 22, 24 are used to choose the magnification and the upper pair of lens sets 26, 28 are used to focus. It should be understood, however, that this arrangement could easily be reversed. The lowest lens set is located on lower fixed bracket 30. The set above that is located on the lower movable bracket 32. Turning to FIGS. 2 and 3, it can be seen that lower movable bracket rides along rails 34 set along the inside of the stereo module 12. Stepper motors (not shown) rotate the endless threaded screws 36, 38 to move either the lower movable bracket 32 or the upper movable bracket 40 a predetermined distance from their respective fixed brackets 30, 42 as will be discussed further below. In the embodiment shown in the drawings, one of the movable brackets is driven by one endless threaded screw, say the lower movable bracket 32 by endless threaded screw 36 and the upper movable bracket 40 by endless threaded screw 38. By rotating the endless threaded screws 36, 38 in small discrete steps, precise control over the distances between the respective fixed and movable brackets can be obtained.

It should be noted at this point that though lens sets are being discussed, the inventive concept behind the instant invention could easily be applied to four separate single lenses in the same manner, controlling the spacing between the respective movable and fixed brackets that carry the specific lens in the same computer controlled method.

The types of corresponding lenses that cooperate with each other to provide the desired magnification are well known to those in the art and form no inventive part of the invention.

Turning to FIGS. 2 and 3, in the embodiment described herein, FIG. 2 represents the spacing of the lens sets in relation to one another when the magnification desired by the user is low. FIG. 3 represents the spacing of the lens sets when the magnification desired by the user is high Depending on the objective selected by the user, this can provide magnification in ranges from between approximately 3.75× to 258×.

Figure 4:
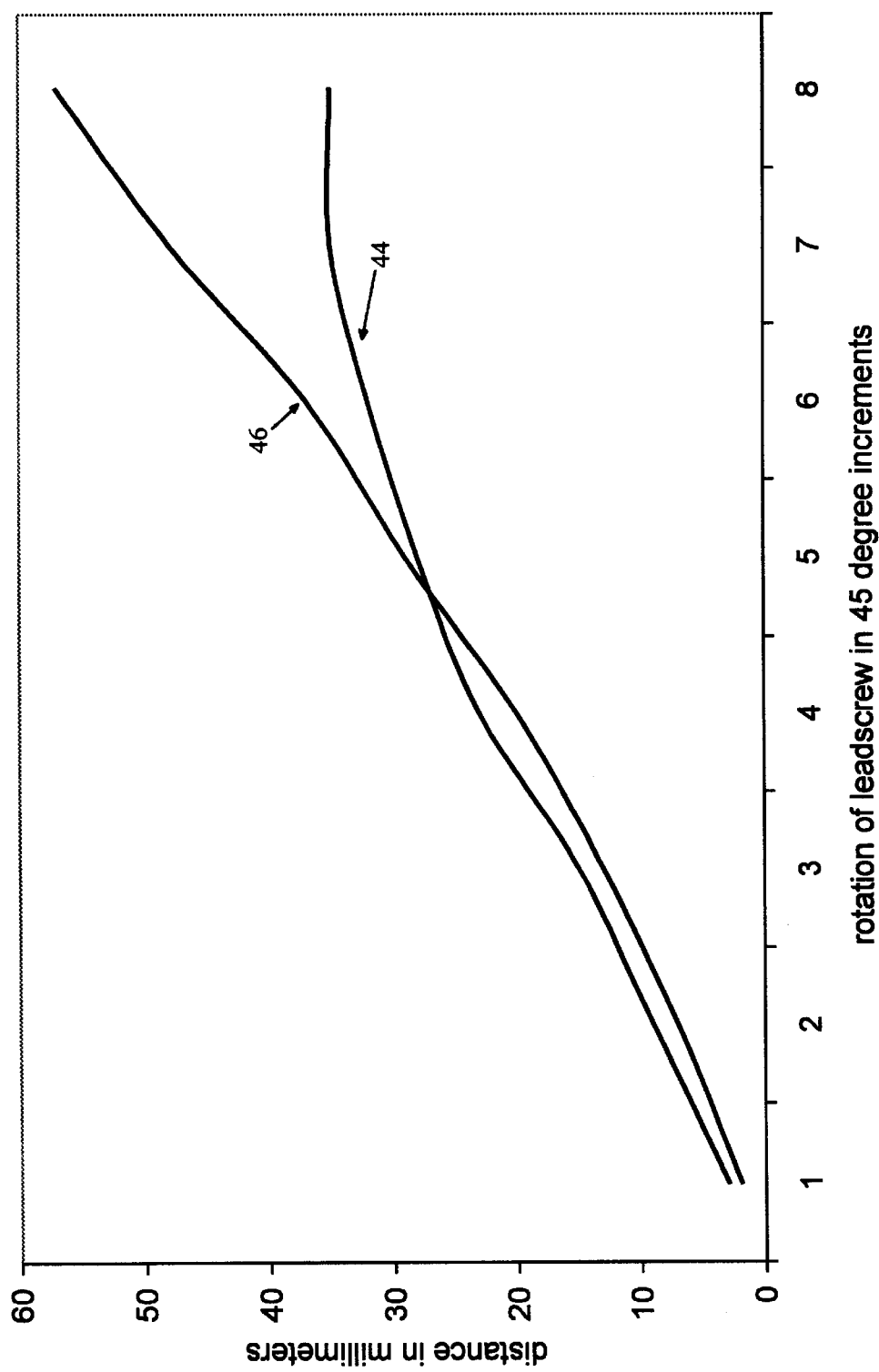
FIG. 4 is a rough graphical depiction of the distance in millimeters between the bottom fixed/bottom moveable and top fixed/top moveable lens sets and the non-linear relation between the two as magnification increases in the instant embodiment of the invention.

Looking at FIG. 4, a critical aspect of the invention is shown The distance between the lower fixed and lower movable and the upper fixed and upper movable lens sets (or single lens) is not proportional. This is why, in the existing art that is manually controlled, such difficult machining and constrution is seen. As both cooperating upper and lower pairs of lens sets move from lower to higher magnification, the distance between the movable and fixed lower set, for example, levels off at a certain point, indicated generally at 44. The top pairing of lens sets distances, however, increases slightly in its slope, as indicated at 46. These non-linear relationships make devices using hand controlled mechanical magnification adjustment and focus extremely expensive, difficult to manufacture, maintain, and repair. The present invention, by using computer controls to set the known required distance relation for a set magnification and focus, eliminates these mechanical contortions, and also allows for more comfortable viewing.

For each specific lens set or type of lens that is being used in a set, The first, lower, movable set is stepped by its motor to a desired magnification Then, the second, upper movable set is moved by its motor to bring the image into focus. The computer then saves these discrete stepping distances in a lookup table and whenever the specific magnification in combination with that specific lens set is called for by a user, the upper and lower movable lens sets 40, 32 are moved into the correct position by their respective stepper motors. For each group of lens sets that the user has or wishes to have, a separate lookup table is either provided or created by the user to position the movable brackets carrying the lens sets at their correct distances from the respective fixed brackets.

Figure 5:
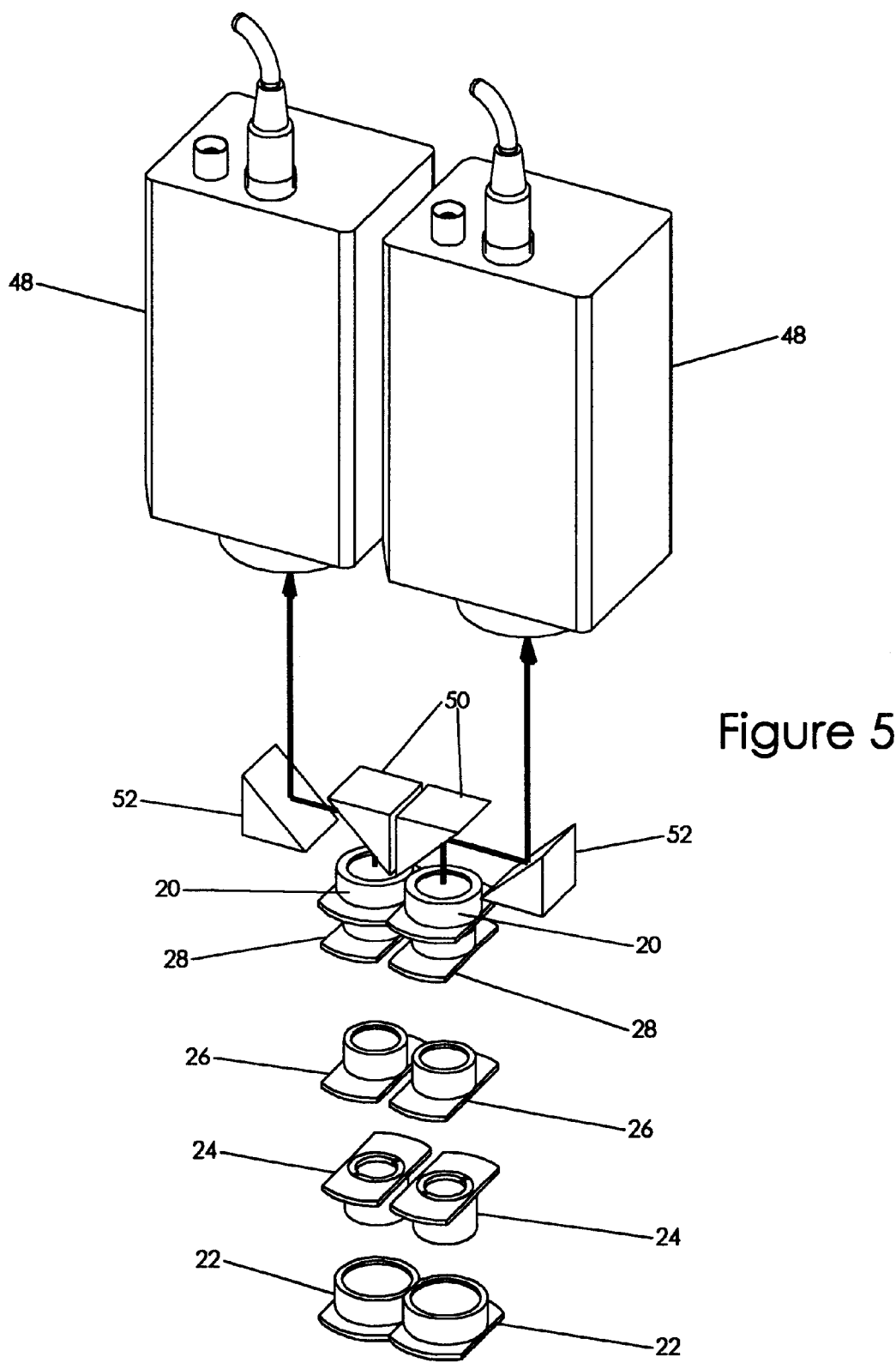
FIG. 5 is a representational example of the computer screen control interface for the instant embodiment of the invention.

Turning now to FIGS. 1 and 5, the cameras that relay the images to the computer (discussed below) will now be briefly addressed. In the embodiment described herein, these cameras 48 are Panasonic GP KR 222s. These receive the images through camera relay lenses 20. Each image is then reflected through a pair of right angle prisms or first surface mirrors as indicated at 50 and 52. Any combination of these optical devices could be used, as their qualities, along with the advantages and disadvantages of using them in different circumstances, are known to those skilled in the art.

The discussion now turns to the computer interface and user control of the apparatus. In FIG. 6 there is a representation of an interface such as would be used with the WINDOWS® operating system and its common graphical interface. The area designated as 54 would be the area in which the view of the work area in focus would be displayed. On the right hand side are the controls for the magnification, focus, and staging controls. At 56 there is the designation of the position of the cursor 58. At 60 and 62 there are the designation of the X-Y position of the staging. Controls for the staging are indicated at 64. Coarse and fine focus controls are indicated at 66 and 68, respectively. The zoom control is indicated at 70. This type of interface is standard in the way that the mouse reacts with the GUI (Graphical User Interface). It should be understood that the interface as thus described could easily be adapted to operating systems other than the one mentioned above. LINUX or any of the MACINTOSH OS would be equally compatible as the interface itself would preferably be written in some offshoot of the "C" language or other multi-platform and operating system language.

The connection between the operating computer C and the instant invention 10 would be accomplished through a standard bus port, a SCSI connection or other type of connection as indicated at 72.

Another feature of the invention is that it provides a unique interface that allows for real-time 3-dimensional interface combined with the Crystal Eyes wireless eyewear system The right and left views are shuttled through at 60 frames/second (120 fields/second) and the Crystal Eyes eyewear, using LCD technology, shutter the frame on the opposite, eye to simulate a three-dimensional view.

In the description above, it should be noted that all of the stepper motors used are commonly available and their control and use are known to skilled practitioners.

What is claimed as being new and desired to be protected by Letters Patent of the United States is as follows:

1. A computer controlled microscopy apparatus for focusing and displaying a magnified image comprising:
   a stage area for containing the object for magnification;
   a top assembly for carrying a lens module, said top assembly being generally perpendicular in relation to said stage assembly;
   a lens module having two fixed lens means and two movable lens means located therein and where said lens module is mounted on said top assembly, said top assembly including means to control the height of said lens module from said stage area, and where a first one of said fixed lens means is mounted proximate said stage area, and a second of said fixed lens means is mounted distal from said stage area, and further where the first of said movable lens means and the second of said movable lens means are located between said first fixed lens means and said second fixed lens means and are movable in relation thereto by movable lens motor movement means; and control means including a predetermined magnification and focus distance setting for both said first and said second movable lens means wherein the distance between said first fixed lens means and said first movable lens means is provided to and accomplished by said movable lens motor movement means and further where the distance between said second fixed lens means and said second movable lens means is provided to and accomplished by said movable lens motor movement means; whereby a user selects a desired magnification and the correct focal distance is automatically provided by said predetermined magnification and focus distance setting and said movable lens motor movement means.

2. The apparatus according to claim 1 wherein said stage area includes stage X-Y motor movement means to control the Cartesian position of said top assembly.

3. The apparatus according to claim 1 wherein said means to control the height of said lens module on said top assembly comprises a height control stepper motor.

4. The apparatus according to claim 1, wherein said movable lens motor movement means comprises a first stepper motor connected to said first movable lens means and a second stepper motor connected to said second movable lens means.

5. A computer controlled stereo microscopy apparatus for focusing and displaying a magnified image comprising:

a stage area for containing the object for magnification;

a top assembly for carrying a lens module, said top assembly being generally perpendicular in relation to said stage assembly;

a lens module having two fixed dual lens means and two movable dual lens means located therein and where said lens module is mounted on said top assembly, said top assembly including means to control the height of said lens module from said stage area, and where a first one of said fixed dual lens means is mounted proximate said stage area, and a second of said fixed dual lens means is mounted distal from said stage area, and further where the first of said movable dual lens means and the second of said movable dual lens means are located between said first fixed dual ens means and said second fixed dual lens means and are movable in relation thereto by movable lens motor movement means; and control means including a predetermined magnification and focus distance setting for both said first and said second movable lens means wherein the distance between said first fixed dual lens means and said first movable dual lens means is provided to and accomplished by said movable lens motor movement means and further where the distance between said second fixed dual lens means and said second movable dual lens means is provided to and accomplished by said movable lens motor movement means; whereby a user selects a desired magnification and the correct focal distance is automatically provided by said predetermined magnification and focus distance setting and said movable lens motor movement means.

6. The apparatus according to claim 1 wherein said stage area includes stage X-Y motor movement means to control the Cartesian position of said top assembly.

7. The apparatus according to claim 1 wherein said means to control the height of said lens module on said top assembly comprises a height control stepper motor.

8. The apparatus according to claim 1, wherein said movable lens motor movement means comprises a first stepper motor connected to said first movable dual lens means and a second stepper motor connected to said second movable dual lens means.

* * * * *